United States Patent
Zhao et al.

(10) Patent No.: US 11,706,756 B2
(45) Date of Patent: Jul. 18, 2023

(54) METHOD OF ALLOCATING UPLINK DATA PACKET RESOURCE AND USER EQUIPMENT

(71) Applicant: CHINA ACADEMY OF TELECOMMUNICATIONS TECHNOLOGY, Beijing (CN)

(72) Inventors: Yali Zhao, Beijing (CN); Pierre Bertrand, Beijing (CN); Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/760,660

(22) PCT Filed: Oct. 16, 2018

(86) PCT No.: PCT/CN2018/110458
§ 371 (c)(1),
(2) Date: Apr. 30, 2020

(87) PCT Pub. No.: WO2019/085741
PCT Pub. Date: May 9, 2019

(65) Prior Publication Data
US 2020/0351915 A1    Nov. 5, 2020

(30) Foreign Application Priority Data
Nov. 3, 2017   (CN) .......................... 201711071243.4

(51) Int. Cl.
*H04W 72/1268* (2023.01)
*H04W 72/23* (2023.01)
(52) U.S. Cl.
CPC ....... *H04W 72/1268* (2013.01); *H04W 72/23* (2023.01)

(58) Field of Classification Search
CPC ............. H04W 72/1268; H04W 72/14; H04W 72/1242; H04W 72/1294; H04W 72/042; H04W 72/10; H04W 72/1278
See application file for complete search history.

(56) References Cited

U.S. PATENT DOCUMENTS

| | | | |
|---|---|---|---|
| 9,661,653 B2 | 5/2017 | Burbidge et al. | |
| 2010/0098011 A1* | 4/2010 | Pelletier ............ | H04W 28/0278 370/329 |

(Continued)

FOREIGN PATENT DOCUMENTS

| | | |
|---|---|---|
| CN | 101873704 A | 10/2010 |
| CN | 105451345 A | 3/2016 |

(Continued)

OTHER PUBLICATIONS

Chinese Office Action dated Feb. 3, 2020 for CN Application No. 201711071243.4.

(Continued)

*Primary Examiner* — Dinh Nguyen
(74) *Attorney, Agent, or Firm* — Harness, Dickey & Pierce, P.L.C.

(57) ABSTRACT

A method of allocating an uplink data packet resource and a user equipment are provided, and the method includes: receiving at least one UL grant sent by a network device; determining, according to Logical Channel Prioritization LCP restriction corresponding to a target object, correspondence relationship between the target object and the UL grant; and performing resource allocation on each UL grant according to the correspondence relationship between the target object and the UL grant; wherein, the LCP restriction includes at least mapping relationship between the target object and a type of UL grant, and the target object is a service type or a logical channel or a logical channel group.

9 Claims, 4 Drawing Sheets

(56) References Cited

U.S. PATENT DOCUMENTS

| | | | | |
|---|---|---|---|---|
| 2014/0135027 A1* | 5/2014 | Kodali | ............... | H04W 72/1278 455/452.1 |
| 2014/0321406 A1* | 10/2014 | Marinier | ................. | H04B 7/024 370/329 |
| 2016/0226632 A1* | 8/2016 | Zhang | .................... | H04L 1/1887 |
| 2017/0208615 A1 | 7/2017 | Zhang et al. | | |
| 2017/0332392 A1 | 11/2017 | Miao et al. | | |
| 2018/0049073 A1* | 2/2018 | Dinan | ............... | H04W 72/1263 |

FOREIGN PATENT DOCUMENTS

| | | | |
|---|---|---|---|
| CN | 106171032 A | | 11/2016 |
| CN | 106961741 A | | 7/2017 |
| CN | 106998590 A | | 8/2017 |
| CN | 107079465 A | | 8/2017 |
| WO | WO-2016/163660 A1 | | 10/2016 |
| WO | WO-2016/163663 A1 | | 10/2016 |
| WO | WO-2017/186160 A1 | | 11/2017 |

OTHER PUBLICATIONS

European Search Report dated Oct. 16, 2020 for Application No. EP 18873382.8.

InterDigital Inc., "LCH Selection in LCP based on Transmission Profiles", Agenda Item 10.3.1.7, 3GPP TSG-RAN WG2 #99, R2-1708728, Berlin, Germany, Aug. 21-25, 2017.

Ericsson, "Logical channel prioritization and transmission profiles", Agenda Item 10.3.1.7, 3GPP TSG-RAN WG2 #99, Tdoc R2-1709474, Update of R2-1707119, Berlin, Germany, Aug. 21-25, 2017.

Samsung, "Consideration of Grant-free Transmission from LCP perspective", Agenda Item 10.3.1.7, 3GPP TSSG RAN WG2 #99bis, R2-1711597, Prague, Czech Republic, Oct. 9-13, 2017.

Written Opinion and International Search Report dated May 5, 2020 for International Application No. PCT/CN2018/110458.

Taiwanese Office Action dated Aug. 27, 2020 for Taiwanese Application No. 10820813140.

Oppo, "LCP restrictions and modelling" Agenda Item 10.3.1.7, 3GPP TSG RAN WG2 #99-bis, R2-1710131, Prague, Czech Republic, Oct. 9-13, 2017.

XTE Corporation, "Consideration on the LCP restriction", Agenda Item 10.3.1.7, 3GPP TSG-RAN WG2 Meeting #99bis, R2-1710317, Prague, Czech Republic, Oct. 9-13, 2017.

Institute for Information Industry (III), "URLLC traffic considering multiple UL grants and LCP restriction parameters", Agenda Item 10.3.1.7, 3GPP TSG-RAN WG2 Meeting #99bis, R2-1710854, Revision of R2-1710768, Prague, Czech Republic, Oct. 9-13, 2017.

Intel Corporation, "LCP restrictions and modelling", Agenda Item 10.3.1.7, 3GPP TSG-RAN Wg2 Meeting #99bis, R2-1710634, Oct. 9-13, 2017, Prague, Czech.

Japanese Office Action dated Jan. 25, 2022 for Japanese Patent Application No. 2020-524588.

* cited by examiner

US 11,706,756 B2

METHOD OF ALLOCATING UPLINK DATA PACKET RESOURCE AND USER EQUIPMENT

CROSS-REFERENCE TO RELATED APPLICATIONS

This application is the U.S. national phase of PCT Application No. PCT/CN2018/110458 filed on Oct. 16, 2018, which claims priority to a Chinese Patent Application No. 201711071243.4, filed in China on Nov. 3, 2017, the disclosure of each of which is incorporated herein by reference in their entirety.

TECHNICAL FIELD

The present disclosure relates to the field of communication technology, and in particular, relates to a method of allocating an uplink data packet resource and a user equipment.

BACKGROUND

In a process of Logical Channel Prioritization (LCP) of a Long Term Evolution (LTE) system, the LCP of the LTE system is performed based on a priority parameter corresponding to a single Radio Bearer (RB) configured by a network. A specific execution process thereof is as follows: firstly, a first round of resource allocation is performed in a descending order of the priority parameters of all logical channels having tokens. The first round of resource allocation is performed based on a Prioritized Bit Rate (PBR) of each logical channel. At the same time, the number of tokens available for each logical channel is updated according to a status of the resource allocation. Then, if there are remaining resources, a second round of resource allocation is performed. The second round of resource allocation is to allocate resources for data other than the PBR in a descending order of the priority parameters of all logical channels having data transmission. Resource allocation is performed until resources are allocated for data of all logical channels having tokens or resources are exhausted.

However, in a future communication system, for example, in a 5G New Radio (NR) communication system, three types of services are mainly supported, which are an enhanced Mobile Broadband (eMBB) service, a massive Machine Type Communications (mMTC) service and a Ultra-Reliable and Low Latency Communications (URLLC) service. For the NR system, at present, restriction factors that need to be considered for the LCP are called LCP restriction. A LCP restriction in the related art mainly includes a Sub-Carrier Space (SCS), a Physical Uplink Shared Channel (PUSCH) transmission duration (which is the same as Transmission Time Interval (TTI) essentially) and a cell. However, because delay requirements of different services in the NR system are different, if only the LCP restriction in the related art is considered, scheduling performance will be constrained.

SUMMARY

Some embodiments of the present disclosure provide a method of allocating an uplink data packet resource and a user equipment, to solve a problem that scheduling performance is constrained.

Some embodiments of the present disclosure provide a method of allocating an uplink data packet resource applied to a user equipment, and the method includes: receiving at least one uplink grant (UL grant) sent by a network device; determining, according to Logical Channel Prioritization (LCP) restriction corresponding to a target object, correspondence relationship between the target object and the at least one UL grant; performing resource allocation on each UL grant according to the correspondence relationship between the target object and the at least one UL grant; wherein the LCP restriction includes at least mapping relationship between the target object and a type of UL grant, and the target object is a service type or a logical channel or a logical channel group.

Optionally, the mapping relationship between the target object and the type of UL grant included in the LCP restriction is determined by the user equipment, or determined by the network device, or specified by a protocol.

Optionally, in a case that the mapping relationship between the target object and the type of UL grant included in the LCP restriction is determined by the network device, the network device sends the mapping relationship to the user equipment via a higher-layer signaling or a physical-layer signaling; or, in a case that the mapping relationship between the target object and the type of UL grant included in the LCP restriction is determined by the user equipment, the method further includes: sending the mapping relationship to the network device via a higher-layer signaling or a physical-layer signaling.

Optionally, the service type is one of a Voice over Internet Protocol (VOIP) service, an Ultra-Reliable and Low Latency Communication (URLLC) service, and an enhanced Mobile Broadband (eMBB) service.

Optionally, the type of UL grant is one of dynamic scheduling, grant-free scheduling, and semi-persistent scheduling.

Optionally, the LCP restriction further includes one or a combination of the following: a subcarrier spacing (SCS), a Physical Uplink Shared Channel (PUSCH) transmission duration, and a Cell.

A user equipment is further provided in some embodiments of the present disclosure, and the user equipment includes: a reception module, configured to receive at least one uplink grant (UL grant) sent by a network device; a determination module, configured to determine, according to Logical Channel Prioritization (LCP) restriction corresponding to a target object, correspondence relationship between the target object and the at least one UL grant; a resource allocation module, configured to perform resource allocation on each UL grant according to the correspondence relationship between the target object and the at least one UL grant; wherein, the LCP restriction includes at least mapping relationship between the target object and a type of UL grant, and the target object is a service type or a logical channel or a logical channel group.

Optionally, the mapping relationship between the target object and the type of UL grant included in the LCP restriction is determined by the user equipment, or determined by the network device, or specified by a protocol.

Optionally, the service type is one of a Voice over Internet Protocol (VOIP) service, an Ultra-Reliable and Low Latency Communication (URLLC) service, and an enhanced Mobile Broadband (eMBB) service.

Optionally, the type of UL grant is one of dynamic scheduling, grant-free scheduling, and semi-persistent scheduling.

Some embodiments of the present disclosure further provide a user equipment, and the user equipment includes a transceiver, a storage, a processor and a program stored on the storage and executable by the processor. The transceiver is configured to receive at least one uplink grant (UL grant) sent by a network device; the processor is configured to read the program in a storage and execute following processes: determining, according to Logical Channel Prioritization (LCP) restriction corresponding to a target object, correspondence relationship between the target object and the at least one UL grant; and performing resource allocation on each UL grant according to the correspondence relationship between the target object and the at least one UL grant; wherein, the LCP restriction includes at least mapping relationship between the target object and a type of UL grant, and the target object is a service type or a logical channel or a logical channel group.

Optionally, the mapping relationship between the target object and the type of UL grant included in the LCP restriction is determined by the user equipment, or determined by the network device, or specified by a protocol.

Optionally, in a case that the mapping relationship between the target object and the type of UL grant included in the LCP restriction is determined by the network device, the network device sends the mapping relationship to the user equipment via a higher-layer signaling or a physical-layer signaling; or, in a case that the mapping relationship between the target object included in the LCP restriction and the type of UL grant is determined by the user equipment, the transceiver is further configured to send the mapping relationship to the network device via a higher-layer signaling or a physical-layer signaling.

Optionally, the service type is one of a Voice over Internet Protocol (VOIP) service, an Ultra-Reliable and Low Latency Communication (URLLC) service, and an enhanced Mobile Broadband (eMBB) service.

Optionally, the type of UL grant is one of dynamic scheduling, grant-free scheduling, and semi-persistent scheduling.

Optionally, the LCP restriction further includes one or a combination of the following: a subcarrier spacing (SCS), a Physical Uplink Shared Channel (PUSCH) transmission duration, and a Cell.

Some embodiments of the present disclosure further provide a computer readable storage medium storing therein a computer program, wherein the program is executed by a processor to implement steps of the method of allocating an uplink data packet resource provided in some embodiments of the present disclosure.

In some embodiments of the present disclosure, at least one uplink grant (UL grant) sent by a network device is received; according to Logical Channel Prioritization (LCP) restriction corresponding to a target object, correspondence relationship between the target object and the UL grant is determined; resource allocation is performed on each UL grant according to the correspondence relationship between the target object and the UL grant; wherein, the LCP restriction includes at least mapping relationship between the target object and a type of UL grant, and the target object is a service type or a logical channel or a logical channel group. Because the type of UL grant is added to consideration of the LCP restriction, the type of UL grant is mapped to the target object, so that the correspondence relationship between the target object and the UL grant is firstly determined in an LCP procedure, and then resource allocation is performed on each UL grant according to the correspondence relationship between the target object and the UL grant. Therefore, the embodiments of the present disclosure may ensure that data transmitted on each UL grant is data desired on the network side, thereby improving scheduling performance.

DETAILED DESCRIPTION

Figure 1:
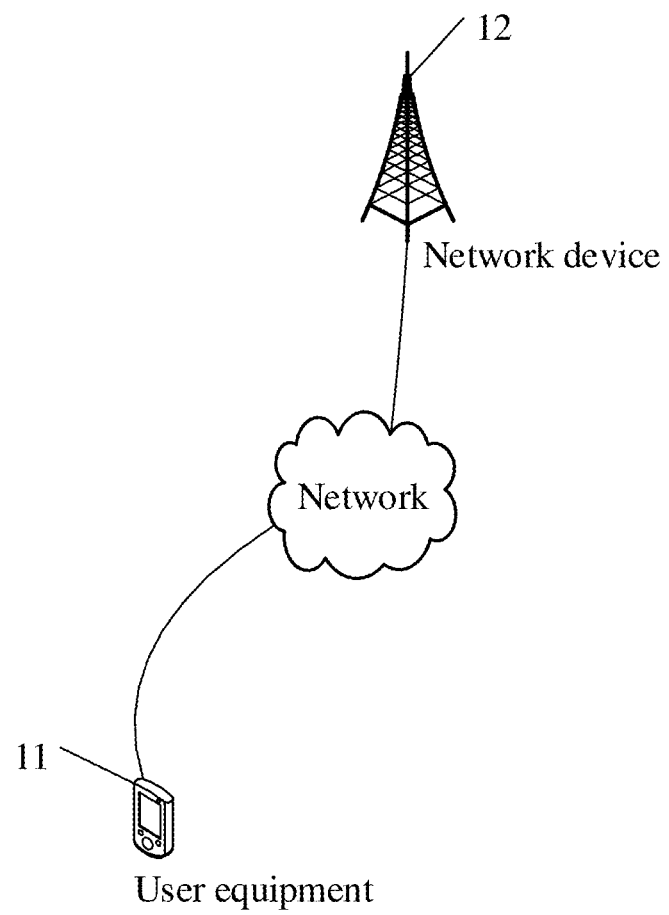
FIG. 1 is a schematic diagram of a network structure applicable to some embodiments of the present disclosure.

Referring to FIG. 1, FIG. 1 is a schematic diagram of a network structure applicable to some embodiments of the present disclosure. As shown in FIG. 1, a User Equipment (UE) 11 and a network device 12 are included. The user equipment 11 may be a mobile phone, a Tablet Personal Computer, a Laptop Computer, a Personal Digital Assistant (PDA), a Mobile Internet Device (MID), or a Wearable Device and other terminal-side devices. It should be noted that a specific type of the user equipment 11 is not limited in some embodiments of the present disclosure. The network device 12 may be a base station, such as, a macro station, an LTE eNB, and a 5G NR NB, etc. The network device 12 may also be a small station, such as a Low Power Node (LPN) pico, and femto, etc., or the network device 12 may be an Access Point (AP); the base station may also be a network node composed of a Central Unit (CU) and a plurality of Transmission Reception Points (TRP) managed and controlled by the CU. It should be noted that a specific type of the network device 12 is not limited in some embodiments of the present disclosure.

Figure 2:
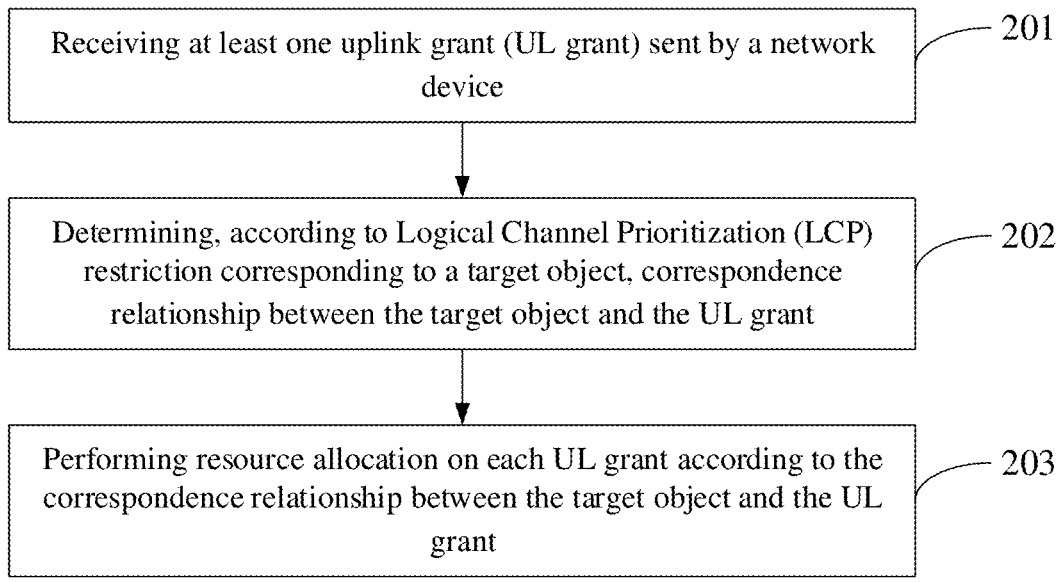
FIG. 2 is a flowchart of a method of allocating an uplink data packet resource provided in some embodiments of the present disclosure.

Referring to FIG. 2, FIG. 2 is a flowchart of a method of allocating an uplink data packet resource provided in some embodiments of the present disclosure. The method of allocating an uplink data packet resource provided in some embodiments of the present disclosure is applied to a user equipment and is configured to control allocation of an uplink data packet resource of the user equipment. As shown in FIG. 2, the method of allocating an uplink data packet resource includes following steps 201-203.

Step 201: receiving at least one uplink grant (UL grant) sent by a network device.

Step 202: determining, according to Logical Channel Prioritization (LCP) restriction corresponding to a target object, correspondence relationship between the target object and the UL grant.

Step 203: performing resource allocation on each UL grant according to the correspondence relationship between the target object and the UL grant.

The LCP restriction includes at least mapping relationship between the target object and a type of UL grant, and the target object is a service type or a logical channel or a logical channel group.

After the user equipment accesses a network device, the network device usually sends instruction information to the user equipment to instruct the user equipment to perform uplink transmission. The UL grant is carried in the instruction information. In a case that there is data to be sent, the user equipment may perform, according to the UL grant sent by the network device, the LCP procedure shown in steps 202 and 203.

It should be understood that the type of UL grant may be set according to actual needs. In the present embodiment, the type of UL grant is one of dynamic scheduling, grant-free scheduling, and semi-persistent scheduling (SPS). The number of UL grants sent by the network device may be set according to actual needs, and is not further limited here. The type of each UL grant to be sent may be one of the dynamic scheduling, the grant-free scheduling, and the semi-persistent scheduling. For example, two UL grants sent by the network device are received by the user equipment, one of the UL grants may be a dynamically scheduled UL grant, and the other UL grant is an SPS grant.

The mapping relationship may be mapping relationship between the type of UL grant and a service type, or mapping relationship between the type of UL grant and a logical channel, or mapping relationship between the type of UL grant and a logical channel group. In a case that the above mapping relationship is the mapping relationship between the service type and the type of UL grant, the mapping relationship is expressed as information of a mapping between a specific service and the type of UL grant; in a case that the above mapping relationship is the mapping relationship between the type of UL grant and the logical channel, the mapping relationship is expressed as information of a mapping between a logical channel number and the type of UL grant; in a case that the above mapping relationship is the mapping relationship between the type of UL grant and the logical channel group, the mapping relationship is expressed as information of a mapping between a logical channel group (i.e., a set of a plurality of logical channels) number and the type of UL grant, for example, a plurality of logical channels and one or more types of UL grants are uniformly mapped.

It should be noted that there may be a plurality of implementation manners for determining the mapping relationship in step 202, for example, the mapping relationship in step 202 may be determined by the user equipment, may be determined by the network device, or may be specified by a protocol.

In a first implementation manner, the mapping relationship in step 202 is determined by the user equipment. Here, each user equipment may determine the mapping relationship per se. After the mapping relationship is determined, the mapping relationship is sent, via a signaling, to the network device currently being accessed, so as to notify the network device. Specifically, in the present embodiment, the user equipment may send the mapping relationship to the network device via a higher-layer signaling or a physical-layer signaling, wherein the higher-layer signaling may be a Radio Resource Control (RRC) signaling or a Media Access Control (MAC) signaling. In addition, the user equipment may also update the mapping relationship. After the mapping relationship is updated, the updated mapping relationship also needs to be sent to the network device.

In a second implementation manner, the mapping relationship in step 202 is determined by the network device. Here, the network device may configure mapping relationship for each user equipment accessing the network device, and send the mapping relationship to a corresponding user equipment. The network device may send the mapping relationship to the user equipment via a higher-layer signaling or a physical-layer signaling. The higher-layer signaling may be an RRC signaling or a MAC signaling. In addition, the network device may also update the mapping relationship. After the mapping relationship is updated, the updated mapping relationship also needs to be sent to the user equipment.

In a third implementation manner, the mapping relationship in step 202 is specified by a protocol. Here, the mapping relationship may be specified in advance by a protocol for the user equipment and the network device, and the user equipment may acquire the mapping relationship specified in the protocol, so as to perform step 202.

In step 202, a target object having data to be sent may be filtered according to the LCP restriction, and correspondence relationship between the target object and the UL grant may be determined accordingly. Each target object is provided with a corresponding LCP restriction, and the LCP restriction includes at least the mapping relationship between the target object and the type of UL grant. Then, resource allocation is performed on each UL grant according to the correspondence relationship between the target object and the UL grant. Specifically, a resource allocation procedure on each UL grant is the same as that in a Long Term Evolution (LTE). That is, the first round of resource allocation is performed according to a priority of a logical channel capable of using the UL grant, to meet PRB requirements of the logical channel; the second round of resource allocation is performed if there are remaining resources, and resources are allocated for remaining data until all resources are exhausted or resources are allocated for all data.

Optionally, the service type is one of a Voice over Internet Protocol (VOIP) service, an Ultra-Reliable and Low Latency Communications (URLLC) service, and an enhanced Mobile Broadband (eMBB) service.

It should be noted that specific mapping content in the mapping relationship may be set according to actual needs. In the present embodiment, in order to ensure a quality of service (QoS) of a service, the mapping relationship is specified as follows, in particular, In a first case, if the mapping relationship is mapping relationship between the service type and the type of UL grant, the mapping relationship may include: mapping between the VOIP service and the dynamically scheduled UL grant and/or the semi-persistently scheduled UL grant; mapping between the URLLC service and the dynamically scheduled UL grant and/or the grant-free scheduled UL grant; mapping between the eMBB service and the dynamically scheduled UL grant.

In a second case, if the mapping relationship is mapping relationship between the logical channel and the type of UL grant, the mapping relationship may include: mapping between a logical channel number and an UL grant.

A logical channel corresponding to the VOIP service is mapped to the dynamically scheduled UL grant and/or the semi-persistently scheduled UL grant; a logical channel corresponding to the URLLC service is mapped to the dynamically scheduled UL grant and/or the grant-free scheduled UL grant; a logical channel corresponding to the eMBB service is mapped to the dynamically scheduled UL grant.

In a third case, if the mapping relationship is mapping relationship between the logical channel group and the type of UL grant, the mapping relationship may include: a mapping between a logical channel group number and an UL grant.

The logical channel corresponding to the VOIP service is mapped to the dynamically scheduled UL grant and/or the semi-persistently scheduled UL grant; the logical channel corresponding to the URLLC service is mapped to the dynamically scheduled UL grant and/or the grant-free scheduled UL grant; the logical channel corresponding to the eMBB service is mapped to the dynamically scheduled UL grant.

It should be understood that, in a process of performing LCP, in addition to the type of UL grant, other LCP restriction may also be considered. For example, in the present embodiment, the LCP restriction may further include one or a combination of the following: an SCS, a PUSCH transmission duration, and a Cell.

It should be noted that a plurality of optional implementation manners described in the embodiments of the present disclosure may be implemented in combination with one another or separately, which is not limited in some embodiments of the present disclosure.

In some embodiments of the present disclosure, at least one uplink grant (UL grant) sent by the network device is received; according to Logical Channel Prioritization (LCP) restriction corresponding to a target object, correspondence relationship between the target object and the UL grant is determined; resource allocation is performed on each UL grant according to the correspondence relationship between the target object and the UL grant; wherein, the LCP restriction includes at least mapping relationship between the target object and a type of UL grant, and the target object is a service type or a logical channel or a logical channel group. Because the type of UL grant is added to consideration of the LCP restriction, the type of UL grant is mapped to the target object, so that the correspondence relationship between the target object and the UL grant is firstly determined in a LCP process, and then resource allocation is performed on each UL grant according to the correspondence relationship between the target object and the UL grant. Therefore, the embodiments of the present disclosure may ensure that data transmitted on each UL grant is data desired on the network side, thereby improving scheduling performance.

In order to better understand the present disclosure, detailed descriptions are provided below through specific implementation manners.

Figure 3:
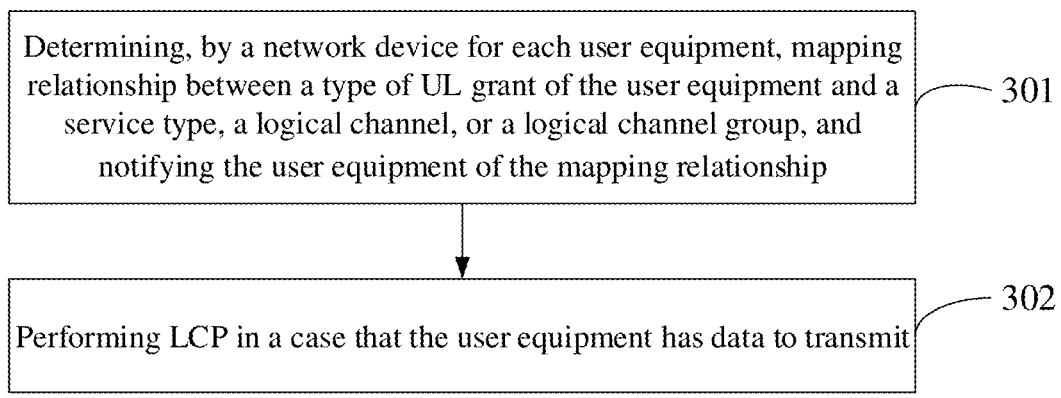
FIG. 3 is a first flowchart of implementation of a method of allocating an uplink data packet resource provided in some embodiments of the present disclosure.

In a first implementation manner, as shown in FIG. 3, a flowchart of implementation of a method of allocating an uplink data packet resource includes steps 301-302.

Step 301: determining, by a network device for each user equipment, mapping relationship between a type of UL grant of the user equipment and a service type, a logical channel, or a logical channel group, and notifying the user equipment of the mapping relationship.

In this step, after the network device determines the mapping relationship, the network device may notify the user equipment of the mapping relationship via a higher-layer signaling (an RRC signaling or a MAC signaling) or a physical-layer signaling, and the network device is allowed to change the mapping relationship. If the mapping relationship is changed, the network device needs to notify the user equipment of the changed mapping relationship again. The user equipment may have a plurality of concurrent services, such as the VOIP, the URLLC, and the eMBB. The following mapping relationship may be adopted: the VOIP service is mapped to the dynamically scheduled UL grant and/or the semi-persistently scheduled UL grant; the URLLC service is mapped to the dynamically scheduled UL grant and/or the grant-free scheduled UL grant; the eMBB service is mapped to the dynamically scheduled UL grant.

Step 302: performing LCP in a case that the user equipment has data to transmit.

In this step, it is assumed that the user equipment has two logical channels (a logical channel 1 and a logical channel 2) having data to be sent, the logical channel 1 corresponds to service data of the VOIP to be sent, and the logical channel 2 corresponds to service data of the eMBB to be sent, and two types of UL grants are received (grant 1 is an SPS grant and grant 2 is a dynamically scheduled UL grant).

In a process of performing LCP, a first step is to determine the correspondence relationship between the logical channel and the UL grant according to the LCP restriction (that is, the correspondence relationship between the logical channel 1 and the grant 1 as well as the grant 2, and the correspondence relationship between the logical channel 2 and the grant 1 as well as the grant 2).

The LCP restriction includes the above mapping relationship, and may also include one or a combination of the following: an SCS, a PUSCH transmission duration, and a Cell.

In the first step, the logical channels of the user equipment having data to be sent are filtered through the LCP restriction, so that the correspondence relationship between the logical channels and the UL grants may be determined. It is assumed that the determined correspondence relationship is as follows.

The logical channel 1 is mapped to the grant 1 and the grant 2; the logical channel 2 is mapped to the grant 2.

In a second step, resource allocation is performed on each UL grant according to the correspondence relationship between the logical channel and the UL grant.

In this step, the resource allocation procedure on each UL grant is the same as that in the LTE. That is, the first round of resource allocation is performed according to a priority of a logical channel capable of using the UL grant, to meet PRB requirements of the logical channel. The second round of resource allocation is performed if there are remaining resources, and resources are allocated for the remaining data until all resources are exhausted or resources are allocated for all data.

Figure 4:
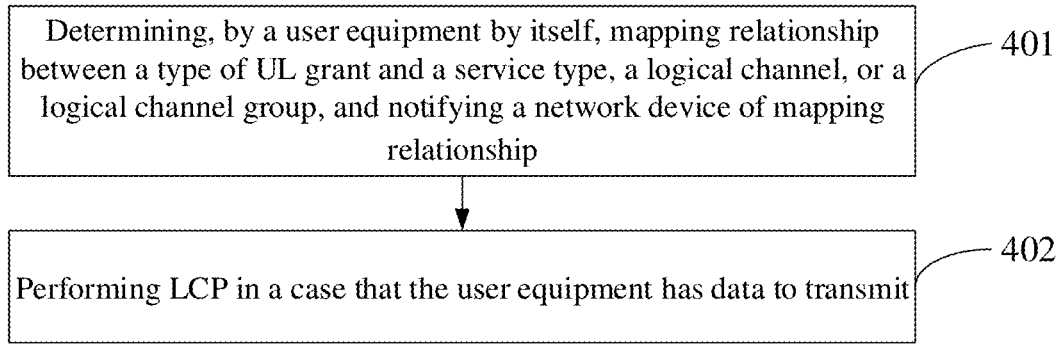
FIG. 4 is a second flowchart of implementation of a method of allocating an uplink data packet resource provided in some embodiments of the present disclosure.
Figure 5:
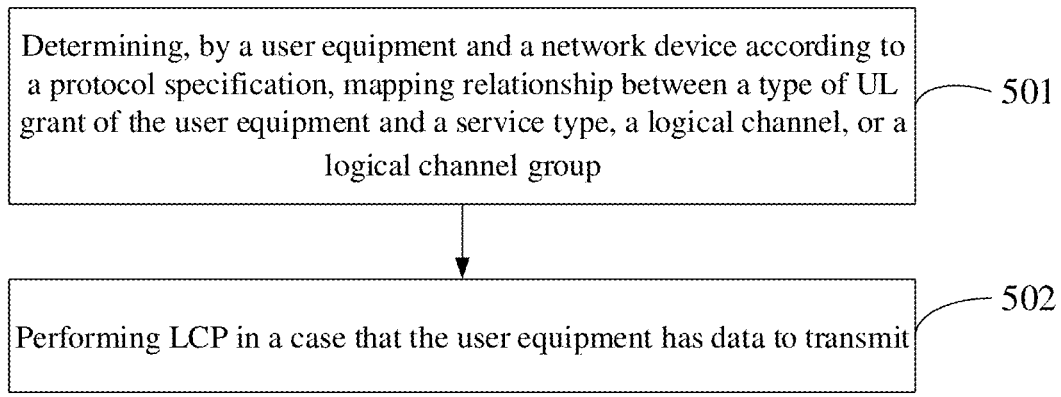
FIG. 5 is a third flowchart of implementation of a method of allocating an uplink data packet resource provided in some embodiments of the present disclosure.

In a second implementation manner, as shown in FIG. 4, a flowchart of implementation of a method of allocating an uplink data packet resource includes steps 401-402.

Step 401: determining, by a user equipment by itself, mapping relationship between a type of UL grant and a service type, a logical channel, or a logical channel group, and notifying a network device of mapping relationship.

In this step, after the user equipment determines the mapping relationship, the user equipment may notify the network device of the mapping relationship via a higher-layer signaling (an RRC signaling or a MAC signaling) or a physical-layer signaling, and the user equipment is allowed to change the mapping relationship. If the mapping relationship is changed, the user equipment needs to notify the network device of the changed mapping relationship again. The user equipment may have a plurality of concurrent services, such as the VOIP, the URLLC, and the eMBB. The following mapping relationship may be adopted: the VOIP service is mapped to the dynamically scheduled UL grant and/or the semi-persistently scheduled UL grant; the URLLC service is mapped to the dynamically scheduled UL grant and/or the grant-free scheduled UL grant; the eMBB service is mapped to the dynamically scheduled UL grant.

Step 402 is consistent with Step 302 in the first example, description of the step 402 may be obtained by specifically referring to the description in the first example, and details thereof are not described herein again.

A third implementation manner is as follows.

Step 501: determining, by a user equipment and a network device according to a protocol specification, mapping relationship between a type of UL grant of the user equipment and a service type, a logical channel, or a logical channel group.

The mapping relationship in this step is determined by the user equipment and the network device according to the protocol specification. For example, the user equipment has a plurality of concurrent services, such as the VOIP, the URLLC, and the eMBB. In this case, the mapping relationship between the type of UL grant and the service type, the logical channel or the logical channel group may be specified in a protocol. The following mapping relationship may be adopted: the VOIP service is mapped to the dynamically scheduled UL grant and/or the semi-persistently scheduled UL grant; the URLLC service is mapped to the dynamically scheduled UL grant and/or the grant-free scheduled UL grant; the eMBB service is mapped to dynamically scheduled UL grant.

Step 502 is consistent with the Step 302 in the first implementation manner, description of the step 502 may be obtained by referring to the description in the first implementation, and details thereof are not described herein again.

Figure 6:
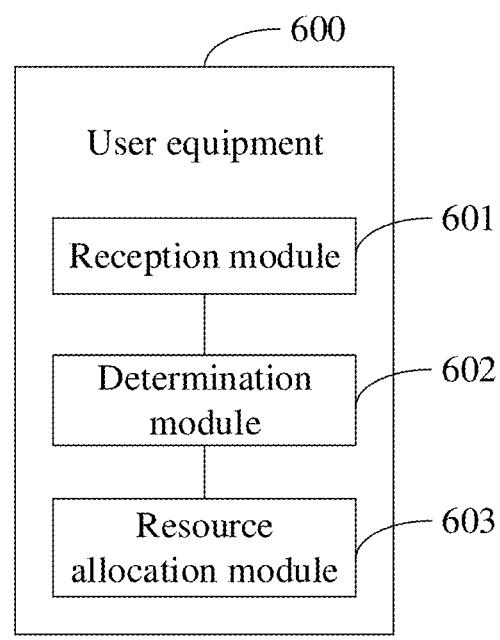
FIG. 6 is a structural diagram of a user equipment provided in some embodiments of the present disclosure.

Referring FIG. 6, FIG. 6 is a structural schematic diagram of a user equipment provided in some embodiments of the present disclosure. As shown in FIG. 6, the user equipment 600 includes: a reception module 601, a determination module 602, and a resource allocation module 603. The reception module 601 is configured to receive at least one uplink grant (UL grant) sent by a network device; the determination module 602 is configured to determine, according to Logical Channel Prioritization (LCP) restriction corresponding to a target object, correspondence relationship between the target object and the UL grant; the resource allocation module 603 is configured to perform resource allocation on each UL grant according to the correspondence relationship between the target object and the UL grant; wherein the LCP restriction includes at least mapping relationship between the target object and a type of UL grant, and the target object is a service type or a logical channel or a logical channel group.

Optionally, in a case that the mapping relationship is sent by the network device, the mapping relationship between the target object and the type of UL grant included in the LCP restriction is determined by the user equipment, or determined by the network device, or specified by a protocol.

Optionally, in a case that the mapping relationship between the target object and the type of UL grant included in the LCP restriction is determined by the network device, the network device sends the mapping relationship to the user equipment via a higher-layer signaling or a physical-layer signaling.

Optionally, in a case that the mapping relationship between the target object and the type of UL grant included in the LCP restriction is determined by the user equipment, the user equipment further includes: a sending module, configured to send the mapping relationship to the network device via the higher-layer signaling or the physical-layer signaling.

Optionally, the service type is one of a Voice over Internet Protocol (VOIP) service, an Ultra-Reliable and Low Latency Communications (URLLC) service, and an enhanced Mobile Broadband (eMBB) service.

Optionally, the type of UL grant is one of dynamic scheduling, grant-free scheduling, and semi-persistent scheduling.

Optionally, the LCP restriction further includes one or a combination of the following: a Sub-Carrier Spacing (SCS), a Physical Uplink Shared Channel (PUSCH) transmission duration, and a Cell.

It should be noted that the user equipment 600 in the present embodiment may be a user equipment in any of the method embodiments in the present disclosure, and any implementation of the user equipment in the method embodiments in the present disclosure may be implemented by the user equipment 600 in the present embodiment, with the same beneficial effects being achieved, and is not detailed herein again.

Figure 7:
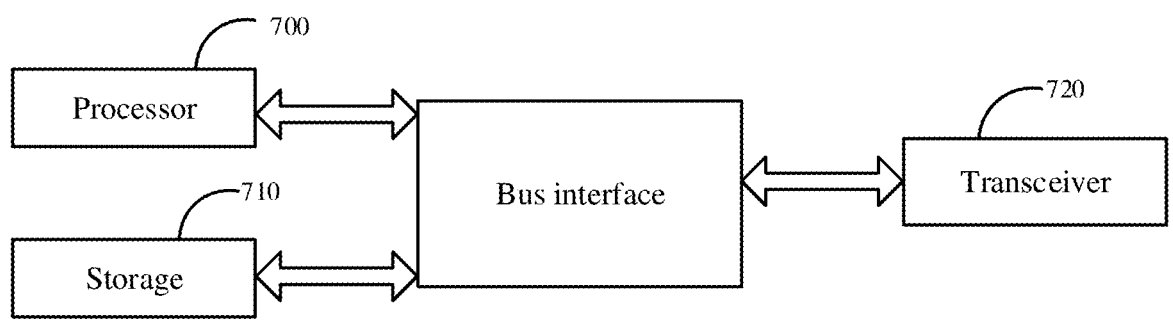
FIG. 7 is another structural diagram of a user equipment provided in some embodiments of the present disclosure.

Please refer to FIG. 7, FIG. 7 is a structural diagram of another user equipment according to some embodiments of the present disclosure. As shown in FIG. 7, the user equipment includes: a transceiver 720, a storage 710, a processor 700, and a program stored on the storage 710 and executable by the processor 700.

The transceiver is configured to receive at least one uplink grant (UL grant) sent by a network device.

The processor is configured to read the program in a storage and execute following processes: determining, according to Logical Channel Prioritization (LCP) restriction corresponding to a target object, correspondence relationship between the target object and the UL grant; and performing resource allocation on each UL grant according to the correspondence relationship between the target object and the UL grant; wherein, the LCP restriction includes at least mapping relationship between the target object and a type of UL grant, and the target object is a service type or a logical channel or a logical channel group.

The transceiver 720 is used to receive and send data under a control of the processor 700.

In FIG. 7, a bus architecture may include any number of interconnected buses and bridges. Various circuits such as one or more processors represented by the processor 700 and a storage represented by the storage 710 are linked together. The bus architecture may also link various other circuits such as peripherals, voltage regulators and power management circuits, which are well known in the art, and therefore a further description thereof is omitted herein. The bus interface provides interfaces. The transceiver 720 may be a plurality of elements, that is, includes a transmitter and a receiver, to provide units configured to communicate with various other apparatuses over a transmission medium.

The processor 700 is responsible for managing the bus architecture and general processing, and the storage 710 may store data used by the processor 700 when performing operations.

It should be noted that the storage 710 is not limited to a single device on a user equipment, and the storage 710 and the processor 700 may be separated in different geographical locations in the further.

Optionally, the mapping relationship between the target object and the type of UL grant included in the LCP restriction is determined by the user equipment, or determined by the network device, or specified by a protocol.

Optionally, in a case that the mapping relationship between the target object and the type of UL grant included in the LCP restriction is determined by the network device, the network device sends the mapping relationship to the user equipment via a higher-layer signaling or a physical-layer signaling.

Optionally, in a case that the mapping relationship between the target object included in the LCP restriction and the type of UL grant is determined by the user equipment, the transceiver is further configured to send the mapping relationship to the network device via the higher-layer signaling or the physical-layer signaling.

Optionally, the service type is one of a Voice over Internet Protocol (VOIP) service, an Ultra-Reliable and Low Latency Communication (URLLC) service, and an enhanced Mobile Broadband (eMBB) service.

Optionally, the type of UL grant is one of dynamic scheduling, grant-free scheduling, and semi-persistent scheduling.

Optionally, the LCP restriction further includes one or a combination of the following: a Subcarrier Spacing (SCS), a Physical Uplink Shared Channel (PUSCH) transmission duration, and a Cell.

It should be noted that the user equipment in the present embodiment may be a user equipment in any of the method embodiments in the present disclosure, and any implementation of the user equipment in the method embodiments in the present disclosure may be implemented by the user equipment in the present embodiment, with the same beneficial effects being achieved, and is not described herein again.

Some embodiments of the present disclosure further provide a computer readable storage medium storing therein a computer program, wherein when the program is executed by a processor, the processor implements steps of the method of allocating an uplink data packet resource provided in some embodiments of the present disclosure.

In some embodiments provided by the present application, it should be noted that, the disclosed method and device may be implemented in other means. For example, the device embodiments described above are merely illustrative. For example, a division of units is only a logical function division. In actual implementation, there may be another division manner, for example, a plurality of units or components may be combined or may be integrated into another system, or some features may be ignored or not be executed. In addition, mutual coupling or direct coupling or communication connection shown or discussed may be an indirect coupling or communication connection through some interfaces, devices or units, and may be in an electrical, mechanical or other form.

In addition, each functional unit in various embodiments of the present disclosure may be integrated into one processing unit, or each functional unit may be included in a separate physical unit, or two or more units may be integrated into one unit. The integrated unit may be implemented in a form of hardware, or may also be implemented in a form of hardware plus software functional units.

The above integrated unit implemented in a form of software functional units may be stored in a computer readable storage medium. The above software functional unit is stored in a storage medium and includes several instructions for causing a computer device (which may be a personal computer, a server, or a network device, etc.) to perform some steps of the methods described in various embodiments of the present disclosure. The foregoing storage medium includes various media that may store program codes, such as a USB flash drive, a mobile hard disk, a Read-Only Memory (ROM for short), a Random Access Memory (RAM for short), a magnetic disk, or an optical disk.

The descriptions above are preferred embodiments of the disclosure. It should be noted that improvements and embellishments may be made by those skilled in the art without departing from the spirit of the present disclosure, and such improvements and embellishments shall be considered to be within the protection scope of the present disclosure.

What is claimed is:

1. A method of allocating an uplink data packet resource, applied to a user equipment, comprising:
performing Logical Channel Prioritization (LCP) based on Logical Channel Prioritization (LCP) restriction, wherein performing LCP based on LCP restriction comprises:
receiving at least one uplink grant (UL grant) sent by a network device;
determining, according to Logical Channel Prioritization (LCP) restriction corresponding to a target object, correspondence relationship between the target object and the at least one UL grant;
performing resource allocation on each of the at least one UL grant according to the correspondence relationship between the target object and the at least one UL grant;
wherein, the LCP restriction comprises at least a mapping relationship between the target object and a selected one of a plurality of types of UL grants selected from among dynamic scheduling, grant-free scheduling and semi-persistent scheduling, and the target object is a service type or a logical channel or a logical channel group;
the service type is one of a Voice over Internet Protocol (VOIP) service, an Ultra-Reliable and Low Latency Communications (URLLC) service, and an enhanced Mobile Broadband (eMBB) service;
when the mapping relationship is mapping relationship between the service type and a type of UL grant, the mapping relationship comprises: mapping between the VOIP service and dynamically scheduled UL grant and/or semi-persistently scheduled UL grant; mapping between the URLLC service and dynamically scheduled UL grant and/or grant-free scheduled UL grant; mapping between the eMBB service and dynamically scheduled UL grant;
when the mapping relationship is mapping relationship between the logical channel and a type of UL grant, the mapping relationship comprises: mapping between a logical channel number and an UL grant, wherein a logical channel corresponding to the VOIP service is mapped to dynamically scheduled UL grant and/or semi-persistently scheduled UL grant; a logical channel corresponding to the URLLC service is mapped to dynamically scheduled UL grant and/or grant-free scheduled UL grant; a logical channel corresponding to the eMBB service is mapped to dynamically scheduled UL grant;
when the mapping relationship is mapping relationship between the logical channel group and a type of UL grant, the mapping relationship comprises: a mapping between a logical channel group number and an UL grant, wherein the logical channel corresponding to the VOIP service is mapped to dynamically scheduled UL grant and/or semi-persistently scheduled UL grant; the logical channel corresponding to the URLLC service is mapped to dynamically scheduled UL grant and/or grant-free scheduled UL grant; the logical channel corresponding to the eMBB service is mapped to dynamically scheduled UL grant.

2. The method according to claim 1, wherein the mapping relationship between the target object and the type of UL grant comprised in the LCP restriction is determined by the user equipment, or determined by the network device, or specified by a protocol.

3. The method according to claim 2, wherein, in a case that the mapping relationship between the target object and the type of UL grant comprised in the LCP restriction is determined by the network device, the network device sends the mapping relationship to the user equipment via a higher-layer signaling or a physical-layer signaling; or, in a case that the mapping relationship between the target object and the type of UL grant comprised in the LCP restriction is determined by the user equipment, the method further comprises: sending the mapping relationship to the network device via a higher-layer signaling or a physical-layer signaling.

4. A user equipment, comprising:
a circuit, configured to perform Logical Channel Prioritization (LCP) based on Logical Channel Prioritization (LCP) restriction;
wherein the circuit further comprises:
a reception circuit, configured to receive at least one uplink grant (UL grant) sent by a network device;
a determination circuit, configured to determine, according to Logical Channel Prioritization (LCP) restriction corresponding to a target object, correspondence relationship between the target object and the at least one UL grant;
a resource allocation circuit, configured to perform resource allocation on each of the at least one UL grant according to the correspondence relationship between the target object and the at least one UL grant;
wherein, the LCP restriction comprises at least a mapping relationship between the target object and a selected one of a plurality of types of UL grants selected from among dynamic scheduling, grant-free scheduling and semi-persistent scheduling, and the target object is a service type or a logical channel or a logical channel group;
the service type is one of a Voice over Internet Protocol (VOIP) service, an Ultra-Reliable and Low Latency Communication (URLLC) service, and an enhanced Mobile Broadband (eMBB) service;
when the mapping relationship is mapping relationship between the service type and a type of UL grant, the mapping relationship comprises: mapping between the VOIP service and dynamically scheduled UL grant and/or semi-persistently scheduled UL grant; mapping between the URLLC service and dynamically scheduled UL grant and/or grant-free scheduled UL grant; mapping between the eMBB service and dynamically scheduled UL grant;
when the mapping relationship is mapping relationship between the logical channel and a type of UL grant, the mapping relationship comprises: mapping between a logical channel number and an UL grant, wherein a logical channel corresponding to the VOIP service is mapped to dynamically scheduled UL grant and/or semi-persistently scheduled UL grant; a logical channel corresponding to the URLLC service is mapped to dynamically scheduled UL grant and/or grant-free scheduled UL grant; a logical channel corresponding to the eMBB service is mapped to dynamically scheduled UL grant;

when the mapping relationship is mapping relationship between the logical channel group and a type of UL grant, the mapping relationship comprises: a mapping between a logical channel group number and an UL grant, wherein the logical channel corresponding to the VOIP service is mapped to dynamically scheduled UL grant and/or semi-persistently scheduled UL grant; the logical channel corresponding to the URLLC service is mapped to dynamically scheduled UL grant and/or grant-free scheduled UL grant; the logical channel corresponding to the eMBB service is mapped to dynamically scheduled UL grant.

5. The user equipment according to claim 4, wherein the mapping relationship between the target object and the type of UL grant comprised in the LCP restriction is determined by the user equipment, or determined by the network device, or specified by a protocol.

6. A user equipment, comprising a transceiver, a storage, a processor and a program stored on the storage and executable by the processor; wherein,
the processor is configured to perform Logical Channel Prioritization (LCP) based on Logical Channel Prioritization (LCP) restriction;
the transceiver is configured to receive at least one uplink grant (UL grant) sent by a network device;
the processor is further configured to read the program in a storage and execute following processes: determining, according to Logical Channel Prioritization (LCP) restriction corresponding to a target object, correspondence relationship between the target object and the at least one UL grant; and performing resource allocation on each of the at least one UL grant according to the correspondence relationship between the target object and the at least one UL grant; wherein, the LCP restriction comprises at least a mapping relationship between the target object and a selected one of a plurality of types of UL grants selected from among dynamic scheduling, grant-free scheduling and semi-persistent scheduling, and the target object is a service type or a logical channel or a logical channel group;
the service type is one of a Voice over Internet Protocol (VOIP) service, an Ultra-Reliable and Low Latency Communication (URLLC) service, and an enhanced Mobile Broadband (eMBB) service;
when the mapping relationship is mapping relationship between the service type and a type of UL grant, the mapping relationship comprises: mapping between the VOIP service and dynamically scheduled UL grant and/or semi-persistently scheduled UL grant; mapping between the URLLC service and dynamically scheduled UL grant and/or grant-free scheduled UL grant; mapping between the eMBB service and dynamically scheduled UL grant;
when the mapping relationship is mapping relationship between the logical channel and a type of UL grant, the mapping relationship comprises: mapping between a logical channel number and an UL grant, wherein a logical channel corresponding to the VOIP service is mapped to dynamically scheduled UL grant and/or semi-persistently scheduled UL grant; a logical channel corresponding to the URLLC service is mapped to dynamically scheduled UL grant and/or grant-free scheduled UL grant; a logical channel corresponding to the eMBB service is mapped to dynamically scheduled UL grant;
when the mapping relationship is mapping relationship between the logical channel group and a type of UL grant, the mapping relationship comprises: a mapping between a logical channel group number and an UL grant, wherein the logical channel corresponding to the VOIP service is mapped to dynamically scheduled UL grant and/or semi-persistently scheduled UL grant; the logical channel corresponding to the URLLC service is mapped to dynamically scheduled UL grant and/or grant-free scheduled UL grant; the logical channel corresponding to the eMBB service is mapped to dynamically scheduled UL grant.

7. The user equipment according to claim 6, wherein the mapping relationship between the target object and the type of UL grant comprised in the LCP restriction is determined by the user equipment, or determined by the network device, or specified by a protocol.

8. The user equipment according to claim 7, wherein, in a case that the mapping relationship between the target object and the type of UL grant comprised in the LCP restriction is determined by the network device, the network device sends the mapping relationship to the user equipment via a higher-layer signaling or a physical-layer signaling; or, in a case that the mapping relationship between the target object and the type of UL grant comprised in the LCP restriction is determined by the user equipment, the transceiver is further configured to send the mapping relationship to the network device via a higher-layer signaling or a physical-layer signaling.

9. A non-transitory computer readable storage medium, comprising:

a computer program stored therein, wherein when the program is executed by a processor, the processor to implement steps of the method of allocating an uplink data packet resource according to claim 1.

* * * * *